UNITED STATES PATENT OFFICE.

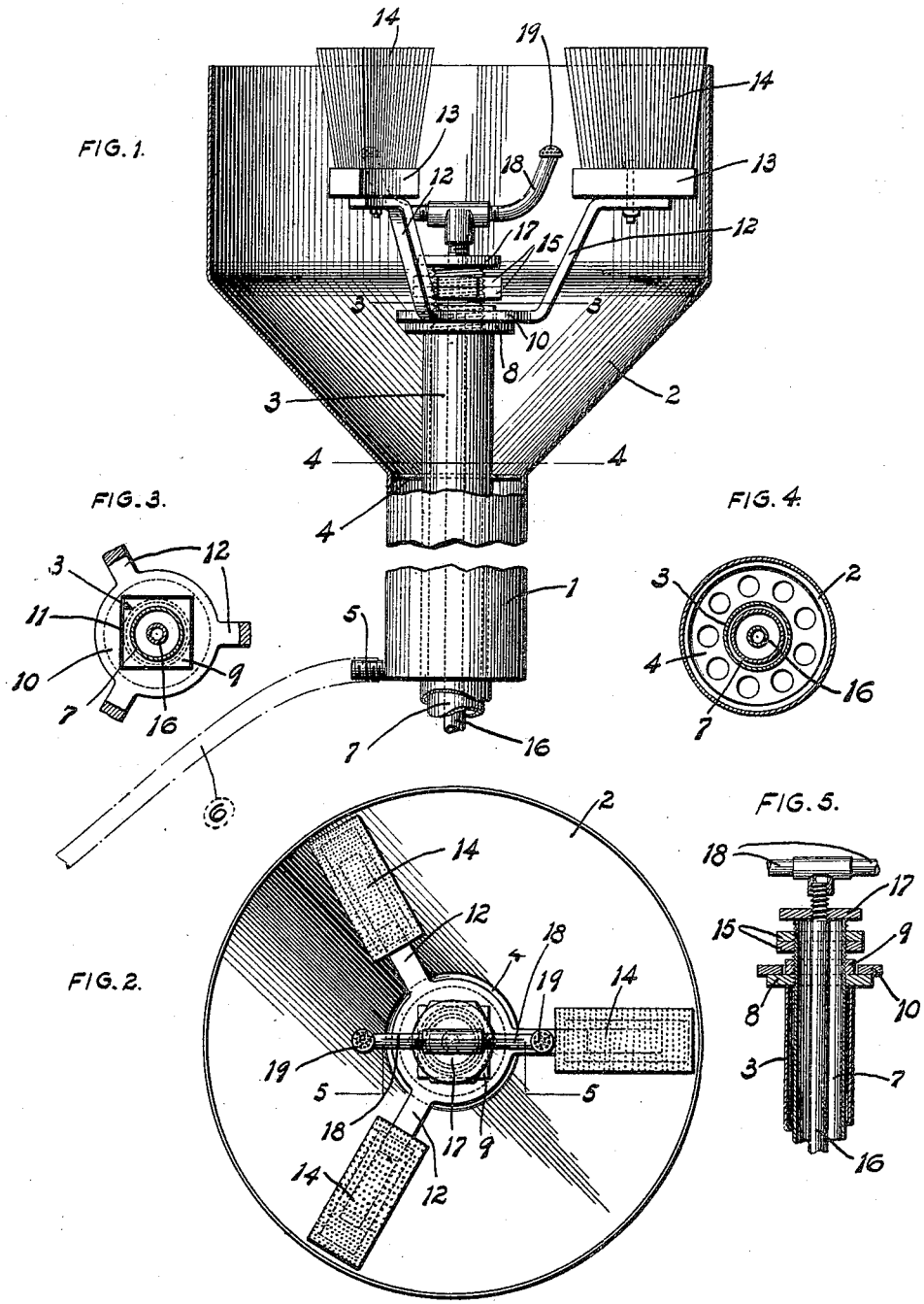

THEODORE A. SCHOENLAU, OF ST. LOUIS, MISSOURI.

CLEANING AND SCRUBBING IMPLEMENT.

994,204.  Specification of Letters Patent.  Patented June 6, 1911.

Application filed June 2, 1910. Serial No. 564,605.

*To all whom it may concern:*

Be it known that I, THEODORE A. SCHOENLAU, a citizen of the United States, residing at St. Louis, Missouri, have invented a certain new and useful Improvement in Cleaning and Scrubbing Implements, of which the following is a full, clear, and exact description, such as will enable others skilled in the art to which it appertains to make and use the same, reference being had to the accompanying drawings, forming part of this specification, in which—

Figure 1 is a side elevation partly in section of a cleaning implement of my improved construction. Fig. 2 is a plan view of the cleaning implement. Fig. 3 is a horizontal section taken on the line 3—3 of Fig. 1. Fig. 4 is a horizontal section taken on the line 4—4 of Fig. 1. Fig. 5 is a vertical section taken approximately on the line 5—5 of Fig. 2.

My invention relates to a cleaning implement particularly adapted for use in washing and scrubbing painted ceilings, and the principal objects of my invention are to arrange a series of brushes which are rotated and engage the surface to be cleaned; to arrange a series of jet nozzles adjacent the rotating brushes, for the purpose of supplying water or a suitable cleaning fluid, and to provide a cup-shaped housing having a tubular handle, and which housing and handle provide means whereby the cleaning water or fluid is carried off to a suitable outlet, thereby preventing the floor and walls from being soiled from said water or cleaning fluid.

To the above purposes my invention consists in certain novel features of construction and arrangement of parts hereinafter more fully described and claimed.

Referring to the numerals in the drawings 1 designates a tubular handle preferably constructed of light metal and carried by the upper end of this handle is a cup-shaped housing 2. The lower end of the tubular handle 1 is closed and passing through said tubular handle and through the closed lower end thereof is a tube 3. Arranged between this tube 3 and the upper end of the tubular handle 1 is a perforated plate 4. Leading from the lower end of the tubular handle 1 is a nipple 5 adapted to receive the end of a flexible tube 6.

7 designates a hollow spindle which extends through the tube 3 and the lower end of said spindle being connected to a suitable motor or device which imparts rotary motion to said spindle. The upper end of the spindle 7 projects above the upper end of the tube 3, and said projecting end is threaded. Seated on this threaded upper end of the spindle is a nut 8 which fits tightly against the upper end of the tube 3. Seated on the threaded end of the spindle immediately above this nut 8 is a rectangular nut 9.

10 designates a disk which rests upon the nut 8 and formed in said disk is a rectangular opening 11 slightly larger than the nut 9.

This construction provides for the rotation of the disk 10 with the nut 9, and at the same time permits said disk to tilt slightly relative to the planes occupied by the nuts 8 and 9.

Arms 12 are formed on or fixed to the disk 10, and project upwardly and outwardly therefrom, and carried by the upper end of these arms are blocks 13 which form the backs of brushes 14, and the tops of these brushes project slightly above the top of the cup-shaped housing 2. In some instances, it may be found desirable to dispense with these brushes, and make use of blocks or suitable holders carrying sponges or a fabric suitable for scrubbing and cleaning purposes.

Seated on the threaded upper end of the spindle 7 a short distance above the nut 9 are one or more nuts 15, which permit the washer 10 to move vertically upon the nut 9, and prevent said washer from wholly leaving said nut 9.

Leading through the hollow spindle 7 is a tube 16 the lower end of which is connected to a suitable source of water supply, and the upper end of this tube 16 is threaded and extends above the upper end of the spindle 7. Seated on the threaded upper end of the tube 16 and resting on the upper end of the spindle 7 is a nut or washer 17 which is for the purpose of preventing the water or cleaning liquid from passing downward through the tubular handle 7. Connected to the upper end of the tube 16 by means of a T-union is a pair of branch pipes 18 which curve upward, and the ends of these branch pipes are provided with perforated nozzles 19 adapted to throw jets of water or cleaning liquid onto the brushes 14 and onto the surface being cleaned.

In the operation of my improved cleaning implement water or a suitable cleaning liquid is forced with pressure through the tube 16 and discharges from the perforated nozzles 19 onto the brushes, and onto the surface being cleaned. The hollow spindle 7 is rotated by suitable means, and as result the brushes 14 are rotated within the cup-shaped housing 2 and around the jets of water or cleaning liquid. The operator manually engages the handle 1 and moves the implement upward until the brushes engage the surface to be cleaned, and thus said surface is thoroughly brushed and scrubbed at the same time the water or cleaning liquid is thrown thereon by the jet nozzles. The dirty water or cleaning liquid is caught by the cup-shaped housing 2 and passes downwardly therethrough and discharges through the perforated plate 4 into the tubular handle 1, and passes from thence off to a suitable outlet through the flexible tube 6. The nut 8 prevents the dirty water or cleaning liquid from passing downward through the tube 3, and the nut or washer 17 prevents said water or cleaning liquid from discharging through the hollow spindle 7. The disk 10 is mounted on the nut 9 in such a manner as to tilt or vibrate relative to the horizontal plane, and for this reason the brushes 14 will readily adjust themselves to any unevenness of the surface being cleaned.

After a ceiling or surface has been washed and scrubbed with my improved implement the brushes can be covered with a suitable fabric or chamois skin and thus dried, and during this drying operation the water or cleaning liquid is cut off through the tube 16.

A cleaning implement of my improved construction is comparatively simple, is light in weight, and can, therefore, be readily manipulated, and where said implement is used for cleaning ceilings the water or cleaning liquid is carried off and thereby prevented from flowing onto the walls and floor.

It will be readily understood that minor changes in the form and construction of the various parts of my improved cleaning implement can be made and substituted for those herein shown and described without departing from the spirit of my invention.

I claim.

1. In a ceiling cleaning implement, a hollow handle having an enlarged end, a scrubbing member arranged for movement in said enlarged end, means passing through the handle for imparting movement to the scrubbing member, means extending through the means for imparting movement to the scrubbing member whereby cleaning liquid is delivered to the scrubbing member, and the surface engaged thereby, and there being an outlet from the end of the tubular handle opposite the enlarged end.

2. In a ceiling cleaning implement, a hollow handle, one end of which is enlarged, and there being an outlet in the opposite end, a tubular spindle extending through the hollow handle into the enlarged end thereof, a detachable spider arranged to rotate with and rock upon the end of the spindle within the enlarged end of the hollow handle, brushes carried by said spider within the enlarged end of the handle, and a tube leading through the hollow spindle and discharging into the enlarged end of the hollow handle for delivering cleaning fluid to the brushes.

3. In a ceiling cleaning implement, a hollow handle having an enlarged end, there being an outlet formed in the opposite end, a plurality of scrubbing members mounted to rotate and rock within said enlarged end, and a cleaning fluid supply pipe extending through the hollow handle into the large end thereof and adapted to deliver cleaning fluid directly onto the scrubbing members and the surface engaged thereby.

In testimony whereof I hereunto affix my signature in the presence of two witnesses, this 28th day of May, 1910.

THEODORE A. SCHOENLAU.

Witnesses:
J. W. CLIFT,
M. P. SMITH.